Sept. 23, 1969           T. K. COWELL           3,468,302
SKIN RESISTANCE REACTION TIME TESTING APPARATUS
Filed May 20, 1966           2 Sheets-Sheet 1
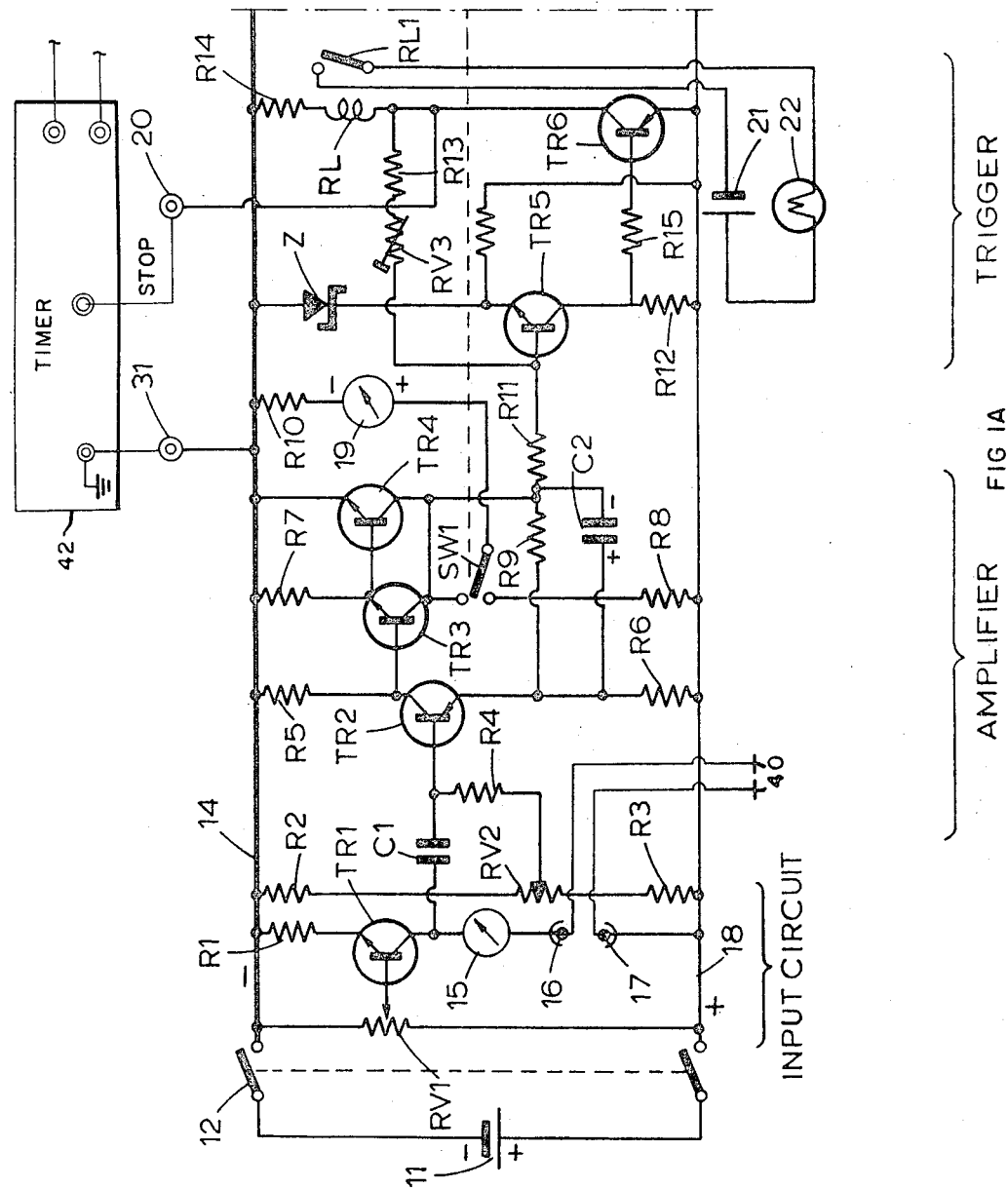
T. K. COWELL
INVENTOR
BY *Norbert Ederer*
ATTORNEY

T. K. COWELL
INVENTOR

BY *Norbert Ederer*

ATTORNEY

United States Patent Office 3,468,302
Patented Sept. 23, 1969

3,468,302
SKIN RESISTANCE REACTION TIME
TESTING APPARATUS
Terence K. Cowell, Woking, Surrey, England, assignor to
Godfrey Brooke, Ilford, Essex, England
Filed May 20, 1966, Ser. No. 551,733
Int. Cl. A61b 5/04
U.S. Cl. 128—2.1                                11 Claims

ABSTRACT OF THE DISCLOSURE

Described is apparatus for testing the reaction time, following a stimulus, of a subject by measurement of skin resistance. A pair of electrodes is attached to separate areas of the subject's skin. The electrodes are connected via an input circuit and coupling means to an amplifier. The couping means passes only changes in voltage between the electrodes. A timer measures the "latency period" (reaction time) in response to a start pulse which occurs at the instant when the subject receives the stimulus. A trigger circuit is connected to the amplifier output and produces a stop pulse for the timer in response to a substantial voltage change in the inpt circuit, due to change in skin resistance.

---

Figure 1B:
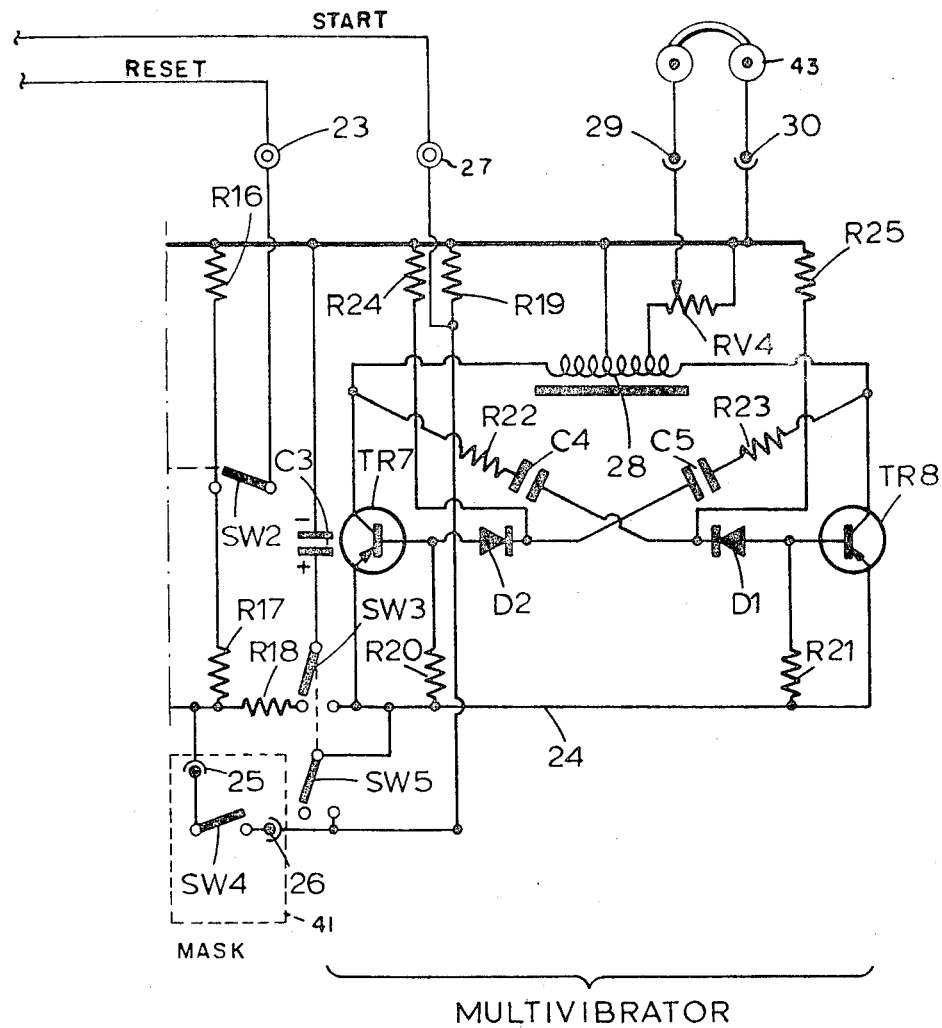

This invention relates to apparatus for testing the electrical resistivity of the skin of a human subject, based on the fact that the amount of moisture in the skin changes quite quickly in response to many stimuli such as noise, flashing lights or emotional stress, and this causes a change in resistance.

It is known that the electrical resistance of the skin changes within a short period of the receipt, by the senses of a human subject, of a stimulus, such as a noise. That is to say, this stimulus produces a change, probably due to a small amount of perspiration, after a short interval, which may only be a few seconds. This, in itself, has been known for some time and attempts have been made to measure this resistance and to use the change in resistance to evaluate certain factors about the subject being tested. The test has been conducted by passing a constant (very small) current between two separate areas of skin of the subject, applying a stimulus and measuring the change in voltage which results after the said interval, which interval will be referred to as the "latency period." The initial current may be adjusted to a suitable level prior to the test and this initial adjustment controls the sensitivity of the apparatus.

Such tests are of considerable value since it is possible, from the latency period, to evaluate the dosage of drugs affecting the central nervous system which may safely be given to particular subjects. The sensitivity of different subjects to powerful drugs varies very widely and the test with the apparatus according to the invention obviates the possibility that a particular subject might be given a dose of a particular drug which is perfectly safe for normal persons but which may be dangerous to a person very sensitive to the particular drug.

The precise determination of the end of the latency period is not easy, since minor changes in skin resistance are continually taking place, and the principal object of the invention is to provide apparatus which responds to the rate of change of the skin resistance, which is large when the change resulting from the stimulus occurs, to determine the end of the latency period.

The apparatus according to the invention performs two functions in (a) measuring the skin resistance, and (b) evaluating the latency period.

The invention consists of an electronic skin resistance testing apparatus comprising an input circuit for connection to a pair of electrodes attached to separate areas of the skin of a subject being tested, an ampliver, coupling means between the input circuit and the amplifier by which only changes in voltage between the electrodes are passed to the amplifier, a timer for measuring the latency period, a starting switch to start the timer at the instant when the subject receives a stimulus, and a trigger circuit connected to the amplifier output to produce a stop pulse for the timer in response to a particular voltage change in the input circuit.

The stimulus which is found most convenient is in the form of sound, but other forms of stimulus may be used. For the purpose of producing the sound an oscillatory circuit may be built into the apparatus which, when operative, produces a momentary tone in earphones which the subject wears. The stimulus may be applied by the subject himself, for example by taking a deep breath, and a face mask may be provided, through which the subject takes this breath, the mask containing a switch actuated by the rush of air through the mask when the subject takes the deep breath, which sets the commencement of the latency period.

In order that the invention may readily be understood and put to practical use, an example thereof will now be described with reefrence to the accompanying drawings, in which FIGURES 1A and 1B considered together, are a circuit diagram of a preferred embodiment of the invention. This circuit is used in conjunction with a pair of electrodes, indicated in FIGURE 1A symbolically by 40, and which form a feature of the invention.

In the past, silver chloride, platinum and lead electrodes have been used in making tests of the kind for which the invention is intended, and these electrodes have been bound on to different fingers of the subject. This arrangement has the disadvantage that natural perspiration of the skin of the subject, as the result of stimuli or otherwise, tends to build up under the binding, so that the apparatus gives a false reading. To overcome these difficulties special electrodes have been devised and these are found to be very reliable and consistent in use. Each electrode consists of a strip of fine wire gauze made of stainless steel or other electrically conductive and non-reactive metal, the ends of the strip of gauze being attached to the arms of a spring clip which is opened to allow the band to gauze to be slipped over a finger of a subject, whereupon release of the clip draws the gauze gently around the skin of the finger.

Referring now to the drawings, the apparatus is powered by a battery 11 which may conveniently be of 9 volts and which may be switched on and off by a double-pole linked switch 12. When switched on, the battery voltage is applied across the ends of a potentiometer RV1, the slider of which is connected to an n-p-n transistor TR1. The emitter of TR1, which is part of an input circuit, is connected through a resistor R1 to a negative line 14, while the collector of TR1 is connected to one side of a meter 15, which is conveniently a micro-ammeter reading 0 to 50 micro-amperes. The two electrodes 40 are connected respectively to a terminal 16 connected to the other side of the micro-ammeter 15 and a terminal 17 connected to a positive supply line 18. The potentiometer RV1 is for initially adjusting the sensitivity of the apparatus, and it will be evident that by adjustment of the slider of this potentiometer the initial current through the transistor TR1 may be set.

Between the lines 14 and 18 is a voltage divider network consisting of a resistor R2, a potentiometer RV2 and a resistor R3, the slider of RV2 being connected through a resistor R4 to the base of a p-n-p transistor TR2. The collector of TR1 is coupled to the base of TR2 through a capacitor C1 so that under steady state conditions no signal reaches TR2, the latter receiving a signal only when a change in the voltage between the electrodes takes place. The collector of TR2 is connected through a resistor R5 to the negative line 14 and the emitter of this transistor is connected through a resistor R6 to the positive line 18. The collector of TR2 is connected directly to the base of a transistor TR3, of n-p-n type, which has its emitter connected through a resistor R7 to the negative line 14. The collector of TR3 is connected to one fixed contact of a two-way switch SW1, the other fixed contact of which is connected through a resistor R8 to the positive line 18. The collector of TR3 is also connected directly to the collector of another transistor TR4, which has its base connected to the emitter of TR3 and has its emitter connected directly to the negative line 14. The transistors TR2, TR3 and TR4 constitute a directly coupled cascade amplifier and there is a feedback from the collectors of TR3 and TR4 through a resistance R9 to the emitter of TR2, this resistor being shunted by a capacitor C2 whose purpose is to reduce the amplification at the mains frequency of 50 c./s.

The moving contact of the switch SW1 is connected to one side of a meter 19, the other side of which is connected through a resistor R10 to the negative line 14. The meter 19 may conveniently be a micro-ammeter reading 0 to 100 micro-amperes, and when the switch SW1 is operated, so that it is connected to resistor R8, the meter 19 provides a check on the battery voltage. The collector of TR4 is connected through a resistor R11 to the base of a transistor TR5 which is of n-p-n type and has its emitter connected through a Zener diode Z to the negative line 14 and has its collector connected through a resistor R12 to the positive line 18.

The base of TR5 is also connected through a variable resistor RV3 in series with a resistor R13 to one side of a relay coil RL which has its other side connected through a resistor R14 to the negative line 14. The junction of R13 and RL is also connected to a terminal 20 which will be referred to again later. The collector of TR5 is connected through a resistor R15 to the base of another transistor TR6 of p-n-p type having its emitter connected directly to the positive line 18 and having its collector connected to the junction of R13 and RL and the terminal 20. The transistors TR5 and TR6 constitute a trigger circuit.

A normally open relay contact RL1 is connected in series with a separate battery 21 and a lamp 22. A voltage divider composed of resistors R16 and R17 in series is connected between the lines 14 and 18 and their junction is connected to the fixed contact of a make-and-break switch SW2 whose moving contact is connected to a terminal 23. The moving contacts of SW1 and SW2 are mechanically linked and their purpose will be more particularly explained later.

The line 18 is connected through a resistor R18 to one fixed contact of a changeover switch SW3, the other fixed contact of which is connected to another positive line 24. The moving contact of the switch SW3 is connected through a capacitor C3 of large capacitance to the negative line 14. The line 18 is connected to a terminal 25, to which one contact of a face mask switch SW4 may be connected, the other contact of the face mask switch being connected to another terminal 26, the terminal 26 being connected through a resistor R19 to the negative line 14. The junction of the terminal 26 and R19 is also connected to one contact of a make-and-break start switch SW5 and a terminal 27, which will be referred to in more detail later. The face mask switch SW4 is used instead of the starting switch SW5 in the case where the subject applies his own stimulus by taking a deep breath, the switch SW4 being a vane-operated switch in the face mask indicated symbolically, as 41 which is closed by the rush of air when the subject takes in air vigorously.

Two further transistors TR7 and TR8 are provided in the apparatus, TR7 and TR8 both being of p-n-p type, and being connected to form an astable multivibrator. The emitters of TR7 and TR8 are connected directly to the line 24. The base of TR7 is connected to the line 24 through a resistor R20, while the base of TR8 is connected to the line 24 through a resistor R21. The collector of TR7 is connected through a resistor R22 in series with a capacitor C4 and a diode D1 to the base of TR8, while the collector of TR8 is connected through a resistor R23, a capacitor C5 and a diode D2 to the base of TR7. Between the collectors of TR7 and TR8 is the winding 28 of a transformer, which is centre-tapped and has its centre tap connected to the negative line 14. The winding 28 has another tapping, so that it acts as an auto-transformer, and this tapping is connected to one end of a potentiometer RV4 whose slider is connected to a terminal 29 and whose other end is connected to a terminal 30 and also to the negative supply line 14.

A resistor R24 is connected between the negative line 14 and the junction of capacitor C5 and diode D2, and a further resistor R25 is connected between the negative line 14 and the junction of capacitor C4 and diode D1.

A terminal 31 connected to the negative line 14, together with terminals 20, 23 and 27, are connected to the timer 42, the terminal 31 being an earth terminal, the terminal 27 being a start terminal by which the timer may be started, the terminal 20 being a stop terminal by which the timer may be stopped, and the terminal 23 being a reset terminal by which the timer may be reset.

A pair of earphones 43 is connected to terminals 29 and 30 and the volume of the tone produced by the multivibrator oscillator formed by transistors TR7 and TR8 and the associated circuitry is adjusted by means of the potentiometer RV4.

In operation, switches SW1, SW2, SW3, SW4 and SW5 are initially in the positions shown in the drawing. The double-pole switch 12 is closed. Linked switches SW1 and SW2, which are of the biased (self-resetting) type, are operated, SW1 enabling the battery voltage on load to be checked and SW2 applying a reset pulse to the timer. Switches SW1 and SW2 are now allowed to reset to the positions shown in the circuit diagram. The electrodes are clipped on to the fingers of the subject so that a small current flows through transistor TR1. This is adjusted to a desired level, as indicated by the meter 15.

The output voltage level of the cascade amplifier is adjusted as required by means of RV2 and is indicated on the meter 19. It is set to a value which ensures optimum trigger sensitivity of the succeeding trigger circuit. The current flowing from the battery charges the capacitor C3 through R18 and SW3 to the full battery voltage. The capacitor C3 is of substantial capacitance, such as 100 μf. The starting switch is operated and this places switches SW3 and SW5 in their alternative positions. The voltage change at terminal 27 provides a pulse which starts the timer, and simultaneously the multivibrator is started by SW3, which connects the capacitor C3 to the line 24. The multivibrator operates on the charge stored in C3 so that it only runs for a comparatively short period, during which it applies the required sonic stimulus to the subject. Shortly after the operation of the starting switch (a matter of a few seconds) the resistance between the electrodes falls and hence the voltage therebetween falls. This causes a positive voltage impulse to be transmitted through capacitor C1 to the base of TR2. TR2 is initially conducting at a low level, and the positive impulse to its base causes it to conduct more heavily, whereby the voltage drop across R5 increases. This drives the base of TR3 more positive, so that TR3, initially slightly conductive, also conducts more heavily. The increased voltage drop across R7 drives the base of TR4 more positive, so that TR4 also conducts more heavily. The potential at the collectors of TR3 and TR4 goes more negative and as a result the base potential of TR5 also goes more negative, so that TR5 ceases to conduct. The trigger circuit operates in its normal manner so that TR6, previously nonconductive, now conducts. The resultant positive impulse at terminal 20 stops the timer and the current through RL operates the relay, to close contacts RL1 and light the lamp 22. The latency period is then read off on the timer. In the meantime the multivibrator has stopped oscillating. The return of SW3 and SW5 to their initial positions reconnects capacitor C3 to the battery for recharging through R18.

In order to carry out the next test the switches SW1 and SW2 are operated momentarily. These may conveniently be in the form of a press button. SW1 indicates the voltage of the battery on meter 19, and SW2 applies a voltage pulse to terminal 23 which resets the timer. The apparatus is then ready for the next test.

It may initially be desired to measure the skin resistance, which may be for a purpose entirely separate from the measurement of the latency period. To measure the skin resistance the potentiometer RV1 is rotated until a maximum value is found on the meter 15. A graph relating meter reading to skin resistance is then consulted in order to determine the actual skin resistance.

It will be appreciated that various modifications may be made to the embodiment described within the scope of the claims appended hereto. For example, the circuitry may be rearranged so as to use p-n-p transistors instead of n-p-n types, and vice versa.

I claim:

1. Apparatus for testing a subject's skin resistance comprising means producing a stimulus to be given to the subject, a timer for measuring the subject's reaction time following the stimulus, a plurality of electrodes adapted to be attached to separate areas of the skin of the subject, and means for generating a start pulse and a stop pulse for said timer to start and stop the reaction time measurement comprising an input circuit connected to said electrodes, an amplifier, coupling means between the input circuit and the amplifier for passing to the amplifier only changes in voltage between the electrodes, a starting switch adapted to be switched to produce said start pulse at the instant the subject receives the stimulus by said stimulus producing means, and a trigger circuit connected to the amplifier output to produce said stop pulse in response to a particular voltage change in the amplifier input circuit.

2. Apparatus as claimed in claim 1, comprising sound generating means which serves as the stimulus producing means, and means connected to the starting switch to initiate the generation of sound by said sound generating means at the instant of switching of the starting switch.

3. Apparatus as claimed in claim 1 comprising a face mask containing a switch arranged so that when the subject draws a deep breath the rush of air into the mask actuates the switch, the switch constituting the starting switch.

4. For use with equipment for testing a subject's skin resistance including means producing a stimulus to be given to the subject, and a timer for measuring the subject's reaction time following the stimulus: apparatus for generating a start pulse and a stop pulse for said timer to start and stop the reaction time measurement, comprising an input circuit adapted for connection to a plurality of electrodes adapted to be attached to separate areas of the skin of said subject, an amplifier, coupling means between the input circuit and the amplifier for passing to the amplifier only changes in voltage between the electrodes, a starting switch adapted to be switched to produce said start pulse at the instant the subject receives the stimulus by said stimulus producing means, and a trigger circuit connected to the amplifier output to produce said stop pulse in response to a particular voltage change in the amplifier input circuit.

5. Apparatus as claimed in claim 4, the stimulus producing means including an electroacoustical transducer for producing sound to stimulate the subject, comprising means for generating an audio signal for application to said transducer to produce the sound, and means connected to the starting switch to initiate the audio signal generation by the audio signal generating means.

6. Apparatus as claimed in claim 5, comprising an oscillatory circuit which is included in the audio signal generating means, a pre-charged capacitor which is connected to the oscillatory circuit at the instant when the start pulse is generated, the capacitor's charge providing power for the oscillatory circuit so that the oscillatory circuit produces the audio signals for only a short period.

7. Apparatus as claimed in claim 4, wherein the aforesaid coupling means comprises a reactance.

8. Apparatus as claimed in claim 4, comprising a battery for supplying power to the apparatus, a meter, a changeover switch having a neutral position and an on-off switch coupled thereto, the placing of the latter two switches in a first position causing the changeover switch to connect the meter to read the voltage of the battery while the on-off switch produces a voltage adapted to reset the timer, the placing of said latter two switches in the other position causing the changeover switch to condition the apparatus for operation.

9. Apparatus as claimed in claim 4 in which the amplifier comprises a multi-stage direct coupled cascade amplifier.

10. Apparatus as claimed in claim 4 comprising a potentiometer to adjust the standing voltage at the input of the amplifier and thereby to adjust the sensitivity of the apparatus.

11. Apparatus as claimed in claim 10 comprising a meter to indicate the sensitivity.

References Cited

UNITED STATES PATENTS

| | | | |
|---|---|---|---|
| 2,535,249 | 12/1950 | Wilhelm et al. | 128—2.1 |
| 2,799,269 | 7/1957 | Mathison | 128—2.1 |
| 3,172,404 | 3/1965 | Copenhaver et al. | 128—2.1 |
| 3,241,549 | 3/1966 | Tyler | 128—2 |
| 3,316,896 | 5/1967 | Thomasset | 128—2.1 |
| 3,320,946 | 5/1967 | Dethloff et al. | 128—2.1 |
| 3,364,929 | 1/1968 | Ide et al. | 128—2 X |

WILLIAM E. KAMM, Primary Examiner